United States Patent
Ostertag

(10) Patent No.: US 6,615,584 B2
(45) Date of Patent: Sep. 9, 2003

(54) METHOD FOR CONTROLLING THE BOOST PRESSURE ON A PISTON INTERNAL COMBUSTION ENGINE WITH A TURBOCHARGER

(75) Inventor: Friedrich Ostertag, Weissach (DE)

(73) Assignee: FEV Motorentechnik GmbH, Aachen (DE)

(*) Notice: Subject to any disclaimer, the term of this patent is extended or adjusted under 35 U.S.C. 154(b) by 0 days.

(21) Appl. No.: 09/913,395

(22) PCT Filed: Dec. 2, 2000

(86) PCT No.: PCT/EP00/12144
§ 371 (c)(1),
(2), (4) Date: Nov. 7, 2001

(87) PCT Pub. No.: WO01/44641
PCT Pub. Date: Jun. 21, 2001

(65) Prior Publication Data
US 2002/0134080 A1 Sep. 26, 2002

(30) Foreign Application Priority Data
Dec. 14, 1999 (DE) .......................... 199 60 166

(51) Int. Cl.$^7$ .......................................... F02D 23/00
(52) U.S. Cl. ................................................. 60/602
(58) Field of Search ............................ 60/600–603

(56) References Cited

U.S. PATENT DOCUMENTS

| | | | |
|---|---|---|---|
| 5,174,119 A | * 12/1992 | Hanauer et al. | 60/602 |
| 5,228,292 A | * 7/1993 | Hanauer et al. | 60/602 |
| 5,875,761 A | 3/1999 | Fujieda et al. | |
| 6,089,018 A | * 7/2000 | Bischoff et al. | 60/602 |
| 6,425,246 B1 | * 7/2002 | Schmid | 60/602 |

FOREIGN PATENT DOCUMENTS

| | | | |
|---|---|---|---|
| EP | 0 323 255 | 7/1988 | 60/602 |
| EP | 0 374 953 | 6/1990 | 60/602 |
| EP | 0 786 589 | 7/1997 | 60/602 |
| WO | WO 00/19073 | * 4/2000 | 60/602 |

* cited by examiner

Primary Examiner—Thomas Denion
Assistant Examiner—Thai Ba Trieu
(74) Attorney, Agent, or Firm—Venable LLP; Norman N. Kunitz

(57) ABSTRACT

The invention relates to a method for controlling the boost pressure on an unsteady-running piston internal combustion engine with a turbocharger. According to the inventive method, a blow-off valve, which is connected upstream from the supercharger turbine in the exhaust gas tract, is controlled by an engine control, the position of the pedal and a boost-proportional gradient are detected by the engine control when initiating an acceleration operation and, when a predeterminable value for the boost-proportional gradient is surpassed, the blow-off valve is actuated in an opening direction in order to effect a predeterminable controlled increase of pressure.

8 Claims, 2 Drawing Sheets

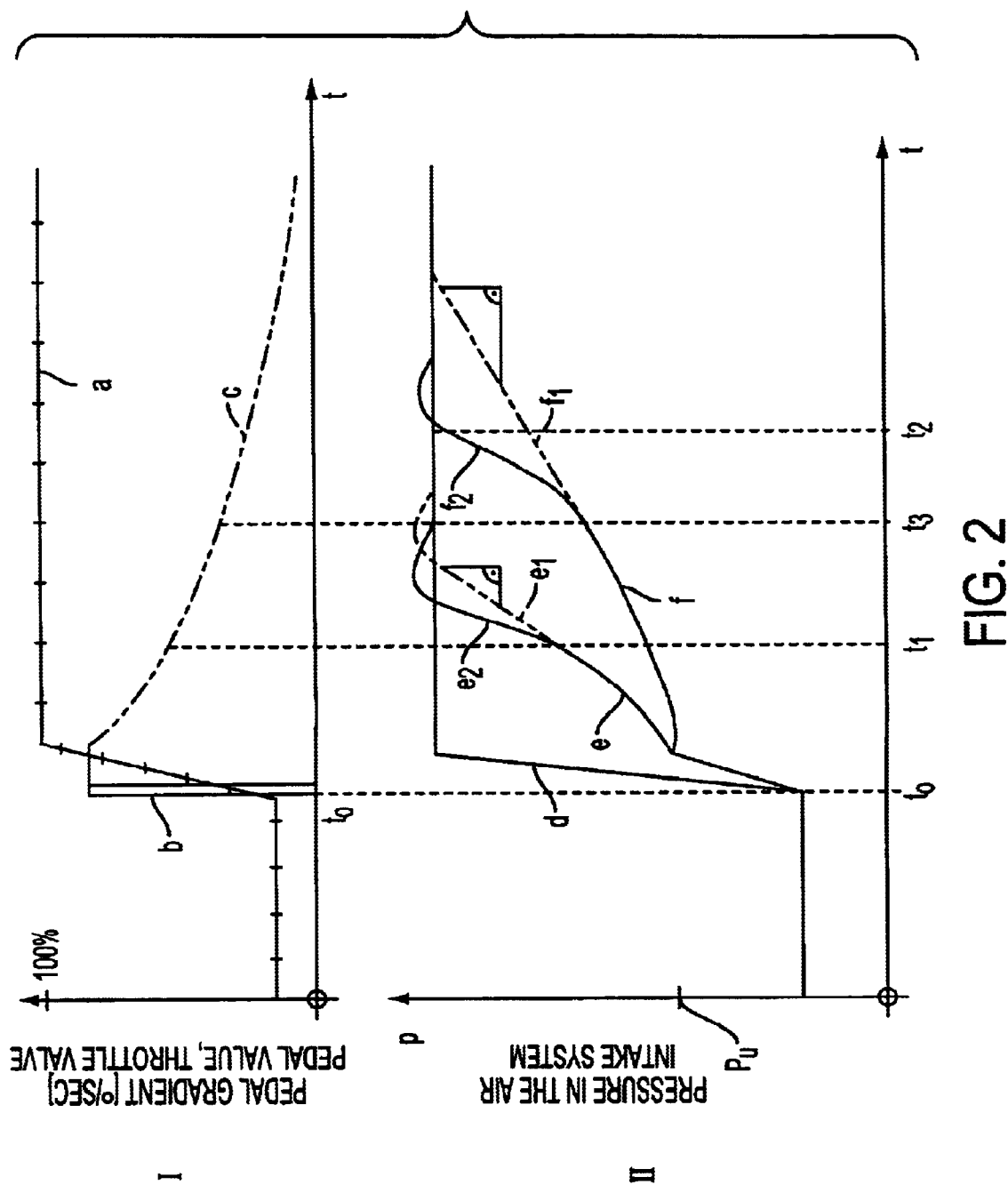

METHOD FOR CONTROLLING THE BOOST PRESSURE ON A PISTON INTERNAL COMBUSTION ENGINE WITH A TURBOCHARGER

BACKGROUND OF THE INVENTION

The piston-type internal combustion engines of motor vehicles, in particular passenger vehicles, which are provided with a turbocharger controlled via a blow-off valve exhibit for specific load conditions a more or less large "turbo hole," meaning a lack of rotational moment. This turbo hole is steady in the low-speed range and unsteady following a jump in the load. In order to keep the unsteady turbo hole small, the boost pressure control must be designed in such a way that following a load demand by the driver, the fastest possible boost-pressure buildup occurs. As a result of the system feedback, a highly progressive boost-pressure increase occurs. An increase in the boost pressure also causes an increase in the exhaust gas energy available for driving the charging turbine. If the acceleration occurs from low gears and starting from low speeds, this can result in a sudden strong increase of the boost pressure and thus to a sudden increase in the rotational moment, even if the driver keeps the pedal position constant at that moment. This is not only considered uncomfortable, but with extremely high performance vehicles can result in danger, owing to a sudden, strong acceleration or spinning of the wheels and a swerving of the vehicle. These problems cannot be solved through specifying a limit for the boost pressure in the air intake tract and a subsequent guided actuation of the blow-off valve. The danger and the impression of discomfort is not caused by the high engine moment per se, but by the increase in the engine moment that is not expected by the driver as a result of the delay.

SUMMARY OF THE INVENTION

It is therefore the object of the invention to specify a method for controlling the boost pressure, which makes the buildup of boost pressure more comfortable, but which also reacts quickly to sudden load demands.

This object is solved according to the invention with a method for controlling the boost pressure of a piston-type internal combustion engine with turbocharger. With this method, a blow-off valve installed in the exhaust gas tract upstream of a charging turbine is controlled by an engine control, which also detects the pedal position and a load-proportional gradient in the event that an acceleration action is initiated. If a predetermined value for the load-proportional gradient is exceeded, the blow-off valve is actuated in an opening direction such that a predetermined controlled pressure increase occurs.

Any measured value of the piston-type internal combustion engine, which is detected in dependence on the time and permits a statement on the change in the respective load condition of the engine in the broadest possible sense, is considered a "load-proportional gradient" within the meaning of the invention. These measured values primarily include the time-dependent change in the boost pressure in the air intake tract, the time-dependent change in the air mass flow or a directly or indirectly determined engine moment. It is also possible to predetermine a model value that is formed from measuring and control variables in the engine control for a time-dependent detection of the engine load.

In addition to specifying an absolute value of the measured value that is intended with the existing control, the measure according to the invention consists in detecting the gradient for this load-proportional measured value, meaning its change per time unit, and in specifying a limit value for this load-proportional gradient. In the even that the limit value is exceeded, the control returns the detected load-proportional gradient to the predetermined limit value by adjusting the blow-off valve in the "open" direction and, depending on the design of the complete system, by also reducing the load control of the engine. The load control intervention can be effected, for example, by adjusting the throttle valve, but also with unconventional methods such as variable valve control times or a mixture control.

As a result, the driver can adequately react to the strong increase in the boost pressure, which results in an increase in the rotational moment of the engine. It is thus avoided that the driver is surprised by an excessively rapid increase in the boost pressure. The rapid increase causes an undesirably high pressure in the air intake tract during the driver reaction time and thus a power output that is not desired or expected by the driver and results, for example, in a spinning of the drive wheels or a forward jump of the vehicle. The driver is given the opportunity to react to the increase in the engine moment with a reduction in the pedal load or even through dynamic driving actions (counter steering).

The operating conditions of the piston-type internal combustion engine and the turbocharger of a motor vehicle change according to specific rules because of the unsteady operation as well as the existence of the gearshift. Thus, it is provided according to one advantageous embodiment of the invention that the respectively predetermined limit values for the load-proportional gradient are taken from a performance characteristic of the engine control. For example, if the pedal is fully depressed at low speeds and in a low gear for an acceleration operation, other values result for the turbocharger behavior and thus also for the rotational moment change of the piston-type internal combustion engine than if this action occurs at a higher speed with a different gear. The same is true for the effect of these changes on the comfort perception of the driver. These differences are taken into account by specifying corresponding performance characteristics in the engine control.

According to one embodiment of the invention, the pedal gradient is furthermore taken into account as a limit value for the load-proportional gradient. The term "pedal gradient" within the meaning of the invention relates to the change in the pedal position in dependence on the time. Thus, if the driver pushes down the pedal only slowly to increase the vehicle speed, or keeps it at a constant position, the driver expects only a slow change in the engine moment and the limit value selected for the load-proportional gradient must be small. If the pedal is pushed down rapidly, the driver expects a correspondingly rapid change in the engine moment. A large load-proportional gradient can be permitted without loss of comfort or safety.

According to another advantageous embodiment of the invention, the respective limit value is taken from the performance characteristic for the pedal gradient that is low-pass filtered in a negative direction. This link favorably takes into account the expectations of the driver. With a constant pedal value, meaning the pedal gradient is zero, the driver normally expects only a moderate change in the rotational moment, even if the pedal value is high. In contrast, if the pedal is pushed down quickly, the driver expects a rapid rotational moment increase that corresponds to the speed of the pedal movement. However, this increase is less and less the farther back the pedal movement for acceleration occurred. As a result of the low-pass filter for the signal "pedal gradient," the pressure increase in the air intake tract that is permitted by the engine control with increasing passage of time between the signal and the response of the turbocharger is lower than would actually be possible. As a result, it is avoided that the driver is surprised by an unexpected, sudden increase in the rotational moment. This value can be modified further in dependence on additional input variables.

According to another advantageous embodiment of the invention, the boost pressure gradient in the air intake tract is detected as the load-proportional gradient. The air mass flow in the air intake tract is proportional to the pressure in the air intake tract and also proportional to the load. As a result, the boost pressure gradient represents a load-proportional gradient that is directly connected to the respective control and regulation actions. If the driver demands a strong acceleration via the pedal position, then the increased fuel supply causes the piston-type internal combustion engine to react by increasing the exhaust-gas energy, which leads to an increase in the boost pressure via the charging turbine and the charger. By detecting the boost pressure gradients, the time curve for the boost pressure increase can be detected and, in case of an undesirably steep increase, the blow-off valve can be adjusted practically extrapolating in the opening direction, so that the increase will become less steep. As a result of the control behavior of the complete system involving the piston-type internal combustion engine and the turbocharger, a corresponding performance characteristic can be provided for the respective load condition and operating condition in the engine control. Thus, if the limit value for the boost pressure gradient that is respectively specified by the performance characteristic is reached, the blow-off valve can be correspondingly opened and the energy supply to the charge turbine can be reduced. It is thus possible to have a sensitive guidance of the boost pressure increase in the air intake tract. In driving situations where the pedal movement leads to the assumption that the driver desires and expects this, the physically possible unsteady performance of the system can be demanded. In situations where it can be assumed that the driver does not expect considerable changes in the rotational moment, the system dynamic can be suppressed to a comfortable and secure measure.

The method according to the invention and the above-discussed embodiments in principle can be used for piston-type internal combustion engines with a choke-free load control as well as a load control effected by a throttle valve in the air intake tract. According to another embodiment of the inventive method, the respective throttle valve position is detected with a control effective via a throttle valve and, if the predetermined value for the boost pressure gradient is exceeded, the throttle valve is adjusted at least at times in the closing direction. A boost pressure increase, which cannot be prevented by adjusting the blow-off valve due to the long idle times of the "blow-off valve/turbocharger" system, can thus be caught with this control action in the air intake tract. An undesirably steep increase in the engine load can therefore still be avoided and the response time of the system can be shortened noticeably. An undesirably rapid increase in the boost pressure is "caught" in the air intake tract already and a sudden rapid increase in the boost pressure is avoided even with a desired strong acceleration. For a piston-type internal combustion engine with a choke-free load control, e.g., via variably controlled cylinder valves, the undesirable boost pressure increase is correspondingly "caught" by changing the valve control times via the engine control.

The invention is explained in further detail with the aid of schematic drawings:

FIG. 2 illustrates the link according to the method between a low-pass filtered pedal gradient and the boost pressure gradients.

DETAILED DESCRIPTION OF THE INVENTION

Figure 1:
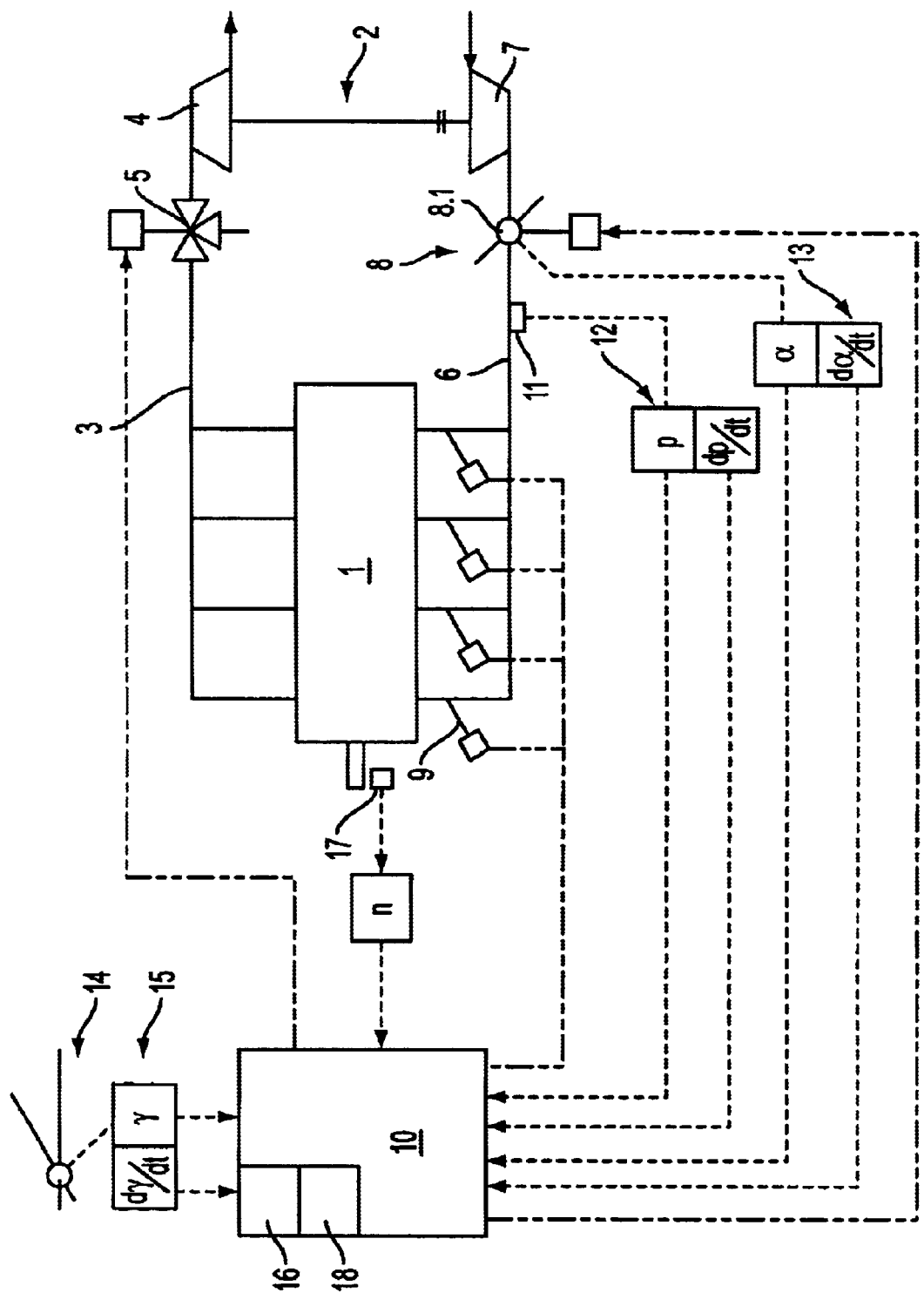
FIG. 1 is a block diagram of a piston-type internal combustion engine with turbo charge control.

The block diagram in FIG. 1 shows a piston-type internal combustion engine 1, with associated turbocharger 2 for increasing the boost pressure of the combustion air, connected via its exhaust gas tract 3 to the charge turbine 4 of the turbocharger 2. A controllable blow-off valve 5 is arranged in the exhaust gas tract 3, upstream of the charge turbine 4.

The piston-type internal combustion engine 1 with its air intake tract 6 is furthermore connected to the compressor 7 of the turbocharger 2. The exemplary embodiment shown herein is a choke-controlled piston-type internal combustion engine with a controllable throttle valve 8, arranged in the air intake tract 6, on the pressure side of the charger 7. As shown schematically with this example, fuel is supplied via controllable injection nozzles 9 to the individual air intake channels leading to the cylinders. The method described in further detail in the following can be used for any type of fuel supply, meaning also for the direct fuel injection.

The piston-type internal combustion engine 1 is provided with a motor control 10, to which all measured values relevant for the engine operation are supplied. All signals necessary for the engine operation are emitted by this motor control following a corresponding processing. However, for the following representation of the mode of operation for the piston-type internal combustion engine with control, the control and regulation actions required for the normal piston-type internal combustion engine operation are presumed known and are not described herein. Described in the following are only those control and regulation connections, which are required for realizing the method according to the invention.

The block diagram separately shows all elements assigned per se to the motor control 10, which are used for detecting and converting the measured values necessary for realizing the method.

With the exemplary embodiment shown herein, the boost pressure gradient is detected as the load-proportional gradient. A pressure transducer 11 is arranged for this in the air intake tract 6. The value measured by this pressure transducer is detected in a computer unit 12 as an absolute value and, following differentiation as the boost pressure gradient dp/dt, wherein both values are made available as separate values to the engine control 10.

The throttle valve 8 with associated adjustment drive furthermore is provided with a transmitter 8.1 for detecting the respective throttle valve position α. In the same way as for the boost pressure detection, a corresponding computer unit 13 is used to determine the absolute value of the respective throttle valve position and, through differentiation, also the throttle valve gradient dα/dt. These two values are also available to the engine control as separate values.

The desired load is fed to the engine control via a pedal 14. With the aid of a corresponding unit 15, the pedal 19 transmits the actual pedal position φ as well as the change over time of the pedal position, meaning the pedal gradient dφ/dt, as an input value to the engine control. The value of the pedal gradient is also taken into account by means of a low pass 16 that is assigned to the engine control 10.

With the exemplary embodiment shown herein, the crankshaft speed of the piston-type internal combustion engine 1 is normally detected via a transmitter 17 and is made available to the engine control 10.

As explained with the aid of FIG. 1, the desired values for the boost pressure and the fuel injection are adjusted to "full load" via the engine control 10 if the pedal 14 is depressed strongly in a low gear. The throttle valve 8 accordingly is opened fully and the amount of fuel injected is increased. Thus, an increased energy amount from the exhaust gas tract 3 is available with the aforementioned delay at the charge turbine 4 that leads to an increase in the boost pressure of the intake tract, which is desired per se. However, since the exhaust gas energy and thus also the boost pressure in the air intake tract 6 increase faster with a corresponding load demand by the pedal 14, e.g. a faster pedal movement, than is good for the operation of the piston-type internal combustion engine and the connected vehicle, the pressure, in particular the boost pressure gradient dp/dt, is detected via the pressure transducer 11. This value is converted in the engine control 10 to an adjustment signal, following a balancing with a value stored in a performance characteristic 18 as limit value for the boost pressure gradient. The engine control will open the blow-off valve 5 and, if necessary, push back the throttle valve 8 at least briefly by a slight measure in closing direction. Thus, an excessive boost pressure increase is "caught" if the actual boost pressure gradient has reached a limit value taken from the performance characteristic for the respective operating condition. The "exhaust gas energy supply" for the charge turbine is taken back and, if necessary, the "air supply" for the piston-type internal combustion engine reduced further by throttling the air flow. This results in a guided increase in the boost pressure, as explained in further detail with the aid of FIG. 2, diagram II, curves $e_1$ and $f_1$.

For this, the blow-off valve 5 is returned to the position predetermined by the engine control and assigned to the pedal value, in accordance with the predetermined values from the performance characteristic 18, so as to achieve the desired steady end pressure.

The throttle valve 8 with its actuation, shown in the block diagram, is omitted for a throttle-free piston-type internal combustion engine control since the cylinder valves are actuated via fully variably controlled valve drives, for example electromagnetic actuators that are controlled directly by the engine control 10. By influencing the opening, moments, but also the opening length for the cylinder valves, the piston-type internal combustion engine load can be controlled in the same way as with a throttle valve.

A rapid actuation of the pedal 14 in a low gear and at a low speed in this case also results in the previously described effect of a delayed "start-up" of the turbocharger and a progressive increase of the boost pressure in the air intake tract 2. The pressure increase in the air intake tract leads to a correspondingly higher cylinder filling with otherwise identical actuation of the valve play for the cylinder valves. Thus, even with a piston-type internal combustion engine that is not controlled by a throttle, the previously described danger of a sudden increase in the rotational moment can occur.

Even with a throttle free control of a piston-type internal combustion engine, it is possible to additionally react to the strong increase in the boost pressure in the air intake tract by detecting the boost pressure gradient via the pressure transducer 11 in the air intake tract 6. This is true through actuating the blow-off valve 5 as well as changing the valve control times for the gas intake valves. Thus, the boost pressure is increased only based on the predetermined values from the performance characteristic.

FIG. 2 shows the preferred embodiment of the method for two different load conditions, with the link between the detection of a low-pass filtered pedal gradient and the detection of the respectively associated boost pressure gradient according to the method. The diagram I in FIG. 2 shows the percentage course of the pedal value with the curve a and, identically, the value of the connected throttle valve position. For an acceleration operation at moment $t_0$, the driver depresses the pedal 14 fully over a short period of time, so that the pedal 14 is held in the full gas position.

The curve b shows the associated pedal gradient. The pedal gradient experiences a steep increase, as shown in curve b, because it takes only a very short time to traverse the pedal angle from the pedal starting position at $t_0$ to the end position at time $t_1$. The increase drops back immediately to "zero" as soon as the pedal end position and thus the end of the pedal movement is reached. This pedal gradient is detected via the engine control 10, as described further in the following, and is stored as a measured value. The measured value is present as a low-pass filtered signal at the engine control, as shown with curve c, so that starting with the original, large pedal gradient, the value decreases with increasing time and a change in the predetermined limit value is possible for the load-proportional gradient.

The associated diagram II shows the course over time of the pressure inside the air intake tract 6. If the pedal is moved rapidly to the full-load position at point in time $t_0$, corresponding to curve a in diagram I, then the desired value according to curve d for the full-load operation is specified for the engine control as the boost pressure in the air intake tract. Owing to the fact that the pressure increase for a turbocharger with speed increase for the charger is initially low, as opposed to a mechanical charger, but then increases quite progressively, the pressure increases correspondingly depending on the load case.

The pressure increase initially is linear until the environmental pressure $p_u$ is reached. Following this, another pressure increase occurs in the intake system through a running up OF the turbocharger, which change occurs rapidly in a first load case. Thus, the boost pressure quickly increases further. For a conventional control according to the curve branch $e_2$, this increase is very steep in the last section before reaching the desired pressure. A strongly delayed response of the turbocharger is shown for the second load case. In that case, the further pressure increase is delayed, without action according to the described method, but then rises steeply according to curve $f_2$ as a result of the system feedback.

This increase in dependence on the time can be detected as the gradient.

A maximum permissible boost pressure gradient, represented by the rise of the dashed curve branches $e_1$ and $f_1$, is specified via a performance characteristic stored in the engine control, as described in the above. If the rise in curves e and f)$f_1$ reaches the limit value, represented by point in time $t_1$ or $t_3$, then a corresponding actuation of the blow-off valve and/or the throttle valve according to the described method is used to sufficiently counteract the boost pressure increase. This results in a guided boost pressure course according to the curve branch $e_1$ and $f_1$.

A different limit value can be selected for the load case "e" than for the load case "f," owing to the change in the predetermined limit value for the boost pressure gradient or in general the load-proportional gradient and the measurable value for the filtered pedal gradient. For the load case "e," only a low damping of the dynamic is required since the driver at point in time $t_1$ still expects an increase in the rotational moment as a result of the fact that the pedal was depressed completely only a short time before. In particular, the driver demands this from the engine via the pedal. In the case "f," the driver also demands the full-load rotational moment, but the engine cannot meet this requirement until the point in time $t_3$ owing to the inertia of the physical system. By influencing the blow-off valve and/or the throttle valve, it is prevented that the driver is surprised at point in time $t_3$ by an increase in the rotational moment that is no longer expected at this level.

What is claimed is:

1. A method for controlling the boost pressure in an unsteadily operated piston-type internal combustion engine with a turbocharger, for which a blow-off valve is installed in the exhaust gas tract upstream of a charge turbine and is controlled via an engine control, said method including:

once an acceleration operation is initiated, detecting, by the engine control, a pedal position and a load-proportional gradient and, once a predetermined value for the load-proportional gradient is exceeded, actuating the blow-off valve in an opening direction such that a predetermined, controlled pressure increase occurs;

and further including taking the pedal gradient into account for the limit value specified for the load-proportional gradient.

2. A method for controlling the boost pressure in an unsteadily operated piston-type internal combustion engine with a turbocharger, for which a blow-off valve is installed in the exhaust gas tract upstream of a charge turbine and is controlled via an engine control, said method including:

once an acceleration operation is initiated, detecting, by the engine control, a pedal position and a load-proportional gradient and, once a predetermined value for the load-proportional gradient is exceeded, actuating the blow-off valve in an opening direction such that a predetermined, controlled pressure increase occurs;

and further including taking the respective limit value of the load-proportional gradient from the performance characteristic via the pedal gradient that is low-pass filtered in negative direction.

3. A method for controlling the boost pressure in an unsteadily operated piston-type internal combustion engine with a turbocharger, for which a blow-off valve is installed in the exhaust gas tract upstream of a charge turbine and is controlled via an engine control, said method including:

once an acceleration operation is initiated, detecting, by the engine control, a pedal position and a load-proportional gradient and, once a predetermined value for the load-proportional gradient is exceeded, actuating the blow-off valve in an opening direction such that a predetermined, controlled pressure increase occurs;

and wherein:

the piston type internal combustion is a piston-type internal combustion engine with a load control effected via a throttle valve in the air intake tract;

and the method further includes detecting the respective throttle valve position and upon exceeding the predetermined value for the boost pressure gradient, displacing the throttle valve in a closing direction, at least at times.

4. A method according to claim 3, wherein the respectively predetermined limit value for the load-proportional gradient is taken from a performance characteristic of the engine control.

5. A method according to claim 3, wherein the boost pressure gradient in the air intake tract is detected as the load-proportional gradient.

6. A method for controlling the boost pressure in an unsteadily operated piston-type internal combustion engine with a turbocharger, for which a blow-off valve is installed in the exhaust gas tract upstream of a charge turbine and is controlled via an engine control, said method including:

once an acceleration operation is initiated, detecting, by the engine control, a pedal position and a load-proportional gradient and, once a predetermined value for the load-proportional gradient is exceeded, actuating the blow-off valve in an opening direction such that a predetermined, controlled pressure increase occurs;

and wherein:

the piston type internal combustion is a piston-type internal combustion engine with a load control effected via variably actuated cylinder valves;

and the method further includes upon exceeding the predetermined value for the load-proportional gradient, resetting the valve control times to reduced load, at least at times.

7. A method according to claim 6, wherein the respectively predetermined limit value for the load-proportional gradient is taken from a performance characteristic of the engine control.

8. A method according to claim 6, wherein the boost pressure gradient in the air intake tract is detected as the load-proportional gradient.

* * * * *